(12) United States Patent
Ryu et al.

(10) Patent No.: US 8,527,735 B2
(45) Date of Patent: Sep. 3, 2013

(54) DATA STORAGE USING VIRTUAL ADDRESSING

(75) Inventors: In-sik Ryu, Suwon-si (KR); Moon-chol Park, Suwon-si (KR); Se-wook Na, Suwon-si (KR); Jae-sung Lee, Suwon-si (KR)

(73) Assignee: Seagate Technology International, Cupertino, CA (US)

( * ) Notice: Subject to any disclaimer, the term of this patent is extended or adjusted under 35 U.S.C. 154(b) by 516 days.

(21) Appl. No.: 12/819,362

(22) Filed: Jun. 21, 2010

(65) Prior Publication Data

US 2010/0325384 A1 Dec. 23, 2010

(30) Foreign Application Priority Data

Jun. 23, 2009 (KR) .................. 10-2009-0055980

(51) Int. Cl.
*G06F 12/08* (2006.01)
(52) U.S. Cl.
USPC .............................................. 711/203; 711/4
(58) Field of Classification Search
USPC ....................................................... 711/4, 203
See application file for complete search history.

(56) References Cited

U.S. PATENT DOCUMENTS

| | | | |
|---|---|---|---|
| 6,128,717 | A | 10/2000 | Harrison et al. |
| 6,665,772 | B1 | 12/2003 | Hamlin |
| 2001/0028524 | A1 | 10/2001 | Hoskins |
| 2001/0048567 | A1 | 12/2001 | Chng et al. |
| 2007/0079053 | A1 * | 4/2007 | Sawa et al. ............ 711/100 |
| 2007/0226451 | A1 * | 9/2007 | Cheng et al. ............ 711/203 |
| 2009/0070547 | A1 | 3/2009 | Jeong et al. |

FOREIGN PATENT DOCUMENTS

| | | |
|---|---|---|
| KR | 20070099234 | 10/2007 |
| KR | 100823171 | 4/2008 |
| KR | 20080030756 | 4/2008 |
| WO | 2006050455 | 5/2006 |

OTHER PUBLICATIONS

European Search Report issued Oct. 1, 2010 in EP Application No. 10166478.7.

* cited by examiner

*Primary Examiner* — Jared Rutz
(74) *Attorney, Agent, or Firm* — Hall Estill Attorneys at Law

(57) ABSTRACT

Provided are a data storage medium accessing method of accessing a data storage medium of a data storage device according to a virtual address (VA), the data storage device to access the data storage medium according to the VA, and a computer readable recording medium having recorded thereon a program to access the data storage medium accessing method. The data storage medium accessing method includes the operations of converting a logical block address (LBA) included in a command received from a host into a VA and converting the VA into a real address of a data storage medium included in a data storage device, and accessing the data storage medium using the real address, wherein the VA is an address that is based on a reserved block of the data storage medium in a data write operation, wherein the reserved block is a valid block that is ready to have data written thereto, and wherein a current location of a head included in the data storage device during the data write operation is set according to the reserved block.

25 Claims, 6 Drawing Sheets

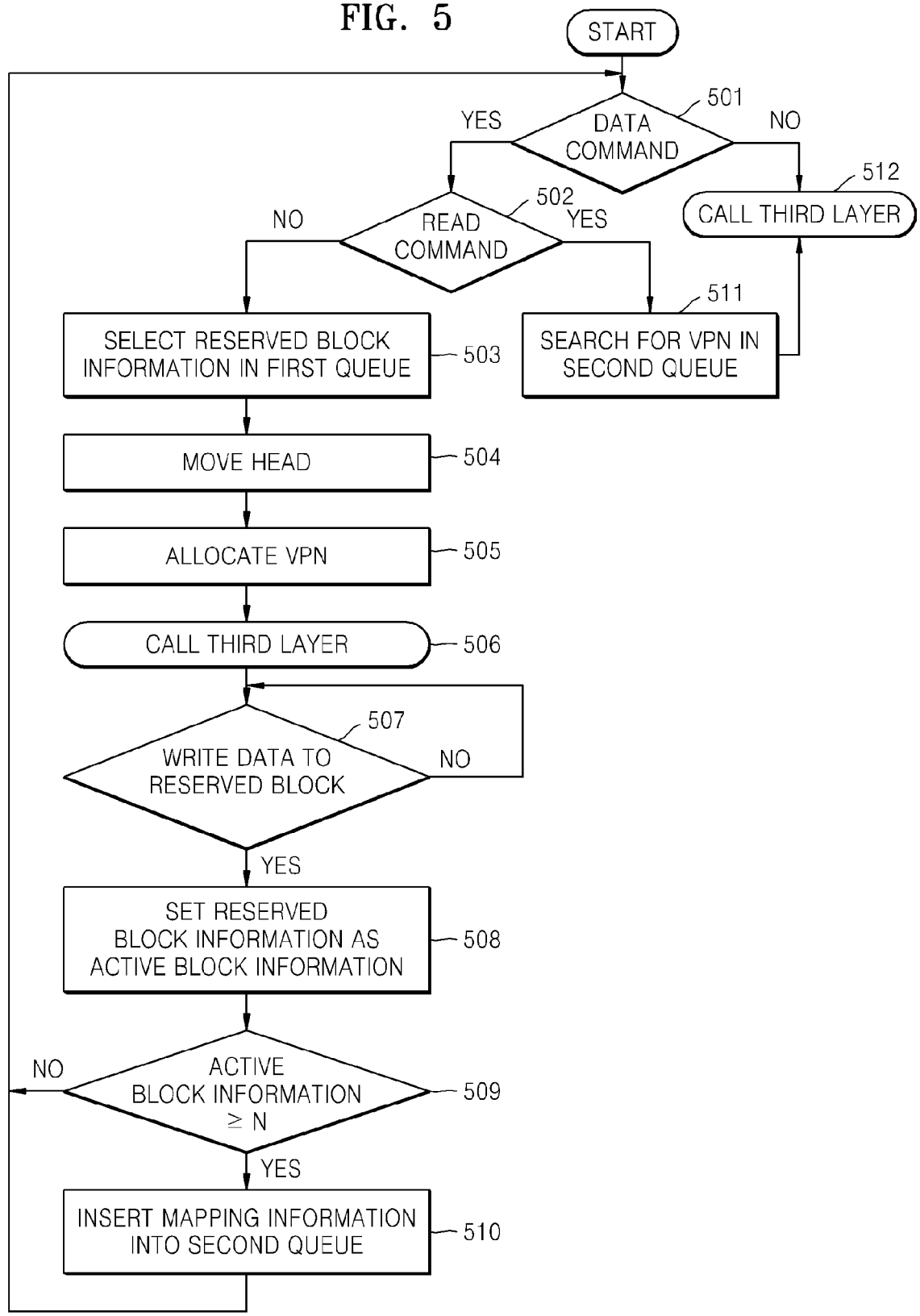

DATA STORAGE USING VIRTUAL ADDRESSING

CROSS-REFERENCE TO RELATED APPLICATIONS

This application claims priority under 35 USC §119 from Korean Patent Application No. 10-2009-0055980, filed on Jun. 23, 2009, in the Korean Intellectual Property Office, the disclosure of which is incorporated herein in its entirety by reference.

BACKGROUND

1. Field of the General Inventive Concept

The present general inventive concept relates to a data storage device, and more particularly, to a method of efficiently accessing a data storage medium in response to a request from a host, a data storage device having a function to perform the method, and a computer readable recording medium having recorded thereon a program to execute the method.

2. Description of the Related Art

In general, a hard disk drive (HDD) is a type of data storage device and is formed as a single storage device to perform access operations of reading data recorded on a disk (or a platter) or writing user data to the disk according to a host command.

Often, the host command includes logical block address (LBA) information that is unrelated to a current location of a head of a data storage device. Thus, when a disk is accessed according to the host command, a cylinder head sector (CHS) that is a real address of stored data or data to be stored in the data storage device and which is based on the LBA information included in the host command, may not match the current location of the head of the data storage device.

When the host command indicates a write command and when the CHS based on the LBA information does not match the current location of the head of the data storage device, as described above, the data storage device performs additional operations such as a seek operation and a head switching operation so as to move the head to a location of the CHS based on the LBA information, thereby increasing access latency of the data storage device.

SUMMARY

Various embodiments of the present disclosure are generally directed to accessing a data storage medium using a virtual address (VA).

In accordance with some embodiments, a controller is generally adapted to receive host commands comprising logical block addresses (LBAs) and to control an interface between the host and a data storage medium based on the host commands. A first queue is used to select a plurality of reserved blocks in the data storage medium that include reserved block information including virtual addresses (VAs) corresponding to physical addresses of the reserved blocks. A memory stores active block information to correspond to reserved block information of the reserved blocks. A second queue stores mapping information of the VAs that correspond to the LBAs of the host commands. A a third queue recycles invalid reserved block information to the first queue.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

Exemplary embodiments of the present general inventive concept will be more clearly understood from the following detailed description taken in conjunction with the accompanying drawings in which:

FIG. 5 is a flowchart illustrating an example to convert a logical block address (LBA) of FIG. 4 into a virtual page number (VPN)

DETAILED DESCRIPTION OF THE EMBODIMENTS

Figure 1:
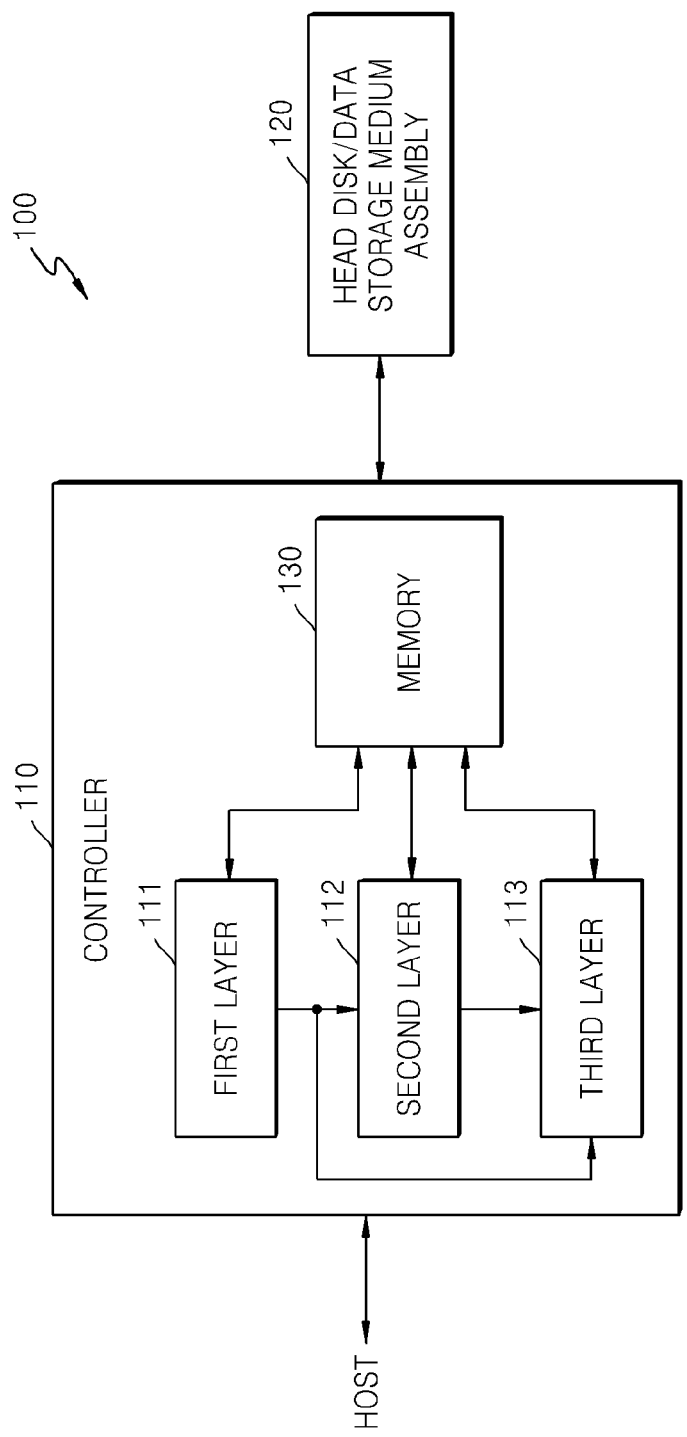
FIG. 1 is a block diagram illustrating a data storage device, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures FIG. 1 is a block diagram illustrating a data storage device 100 according to an embodiment of the present general inventive concept. Referring to FIG. 1, the data storage device 100 includes a controller 110 and a head disk/data storage medium assembly (HDA) 120.

The controller 110 controls an interface that transmits information including communications and data between a host (not illustrated) and the HDA 120.

The host (not illustrated) may be an apparatus that operates according to Windows-based or other operating system programs. For example, the host may be a computer system operated locally to control the data storage device 100 or may be located remote to the data storage device 100 via a network connection or through the internet. The computer system may include one or a plurality of computer terminals that may access the data storage device 100. The data storage device 100 may use a virtual address (VA) to access one or a plurality of data storage mediums included in the data storage device 100 by using any number of alphanumeric and other characters as address values, regardless of the type of operating system program of the host.

The virtual address may correspond to a physical address of a track, cylinder, sector, cluster, head, or a combination of these locations that identify a desired memory location of stored information or information to be stored within one or more data storage mediums 12 of the HDA 120. The data storage device 100 may also include a memory 130 to store data and operational information of the controller 110 and head disk assembly 120. The memory 130 may be disposed within the controller 110, external to the controller 100, or have portions within and external to the controller 110.

In the case where the data storage device 100 is a hard disk drive (HDD), the HDA 120 may be a head disk assembly. The HDA 120 may have a structure similar to that illustrated in FIG. 2.

The HDA 120 may include at least one data storage medium 12 rotated by a spindle motor 14. The data storage medium 12 may be a magnetic disc or a disc. The HDA 120 includes a head 16 located close to a surface of the data storage medium 12. The head 16 may be referred to as a converter.

The head 16 may detect a magnetic field of the data storage medium 12 or may magnetize the data storage medium 12, and thus respectively read data from the data storage medium 12 or write data to the data storage medium 12. In general, the head 16 is coupled to the surface of the data storage medium 12. Although the head 16 is illustrated as a single head in relation to FIG. 2, this is for illustrative purposes only, and it should be assumed that the head 16 is formed of a write head to magnetize the data storage medium 12 and a read head to detect the magnetic field of the data storage medium 12. The read head may be formed of a magnetoresistive (MR) element. The HDA 120 may also include a plurality of heads 16 stacked one atop another to correspond to a plurality of data storage mediums (platters) 12 of the HDA 120.

The head 16 may be integrated into a slider 20. The slider 20 has a structure capable of generating an air bearing or air gap between the head 16 and the surface of the data storage medium 12. The slider 20 is coupled to a head gimbal assembly (HGA) 22 that is attached to an actuator arm 24 having a voice coil 26. The voice coil 26 is located close to a magnetic assembly 28 so as to define a voice coil motor (VCM) 30. A current supplied to the voice coil 26 generates a torque that rotates the actuator arm 24 with respect to a bearing assembly 32. The rotation of the actuator arm 24 allows the head 16 to move while crossing the surface of the data storage medium 12.

In general, data is stored in a plurality of circular tracks 34 of the data storage medium 12. Each of the circular tracks 34 generally includes a plurality of sectors. Each of the sectors includes a data field and an identification field. The identification field includes a gray code to identify a sector and a track (cylinder). The head 16 moves while crossing the surface of the data storage medium 12 so as to read or write information in different tracks and sectors.

Figure 2:
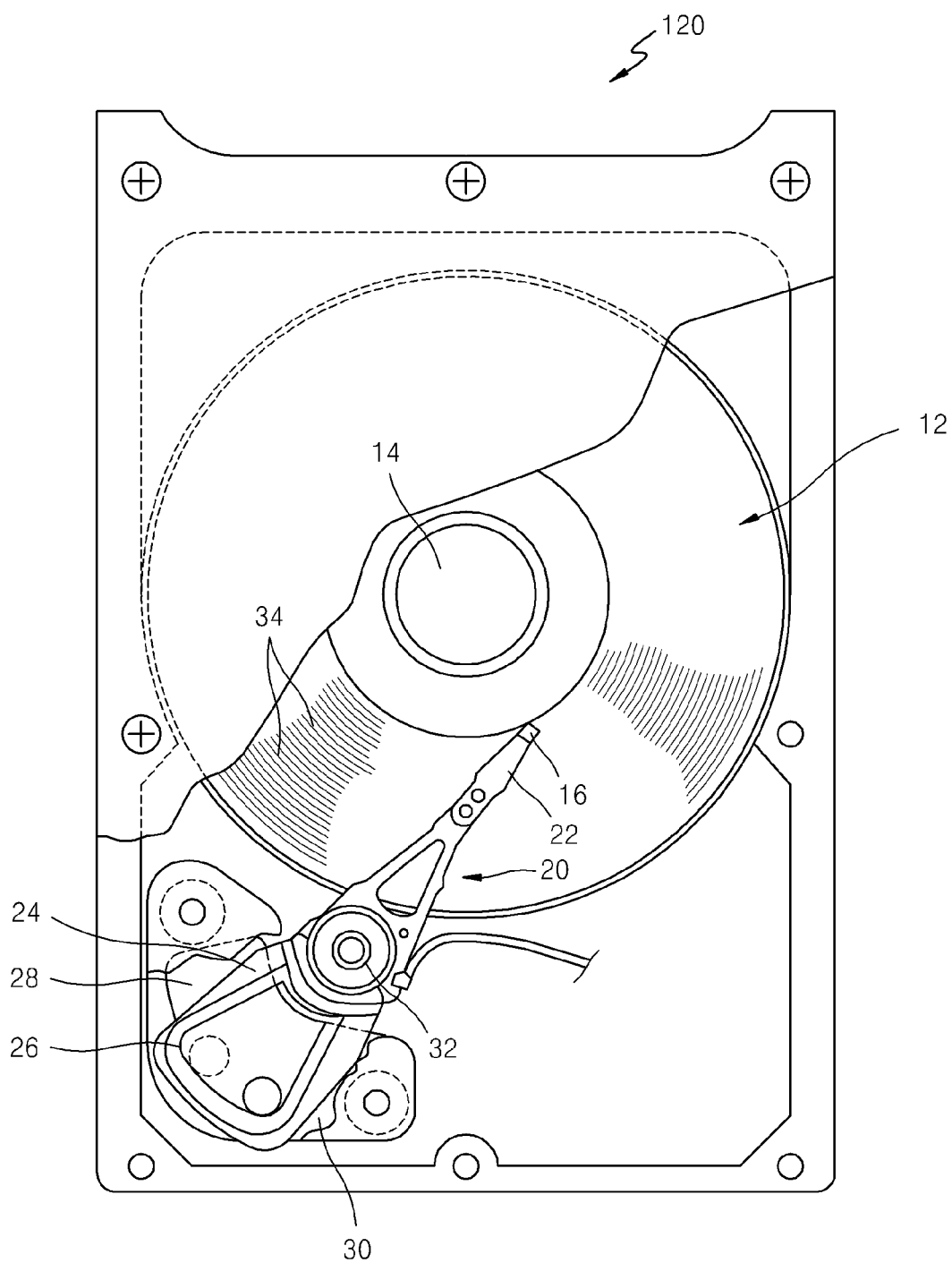
FIG. 2 is a detailed structure diagram illustrating a head disk/data storage medium assembly (HDA) of FIG. 1.

As illustrated in FIGS. 1 and 2, the controller 110 may control operations of the at least one HDA 120 according to a command received from the host (not illustrated). In particular, according to a current embodiment, when a command is received from the host, the controller 110 may convert a logical block address (LBA) included in the command from the host into a virtual address (VA) based on a location of a reserved block of the data storage medium 12, and then may access the data storage medium 12 using the virtual address.

The reserved block is a valid storage block in the data storage medium 12 and is ready to have data written thereto. The virtual address is defined based on a cylinder head sector (CHS) that is a real address of the reserved block. The virtual address may be converted to a real address of the data storage medium 12 included in the data storage device 100, and the data storage medium 12 may be accessed using the real address. Virtual addresses and their corresponding CHS locations may be stored in table form in the memory 130 and accessed by the controller 110. For example, the virtual address may be defined as illustrated in Table 1.

TABLE 1

| Virtual address | CHS |
|---|---|
| 1 | cylinder 1 - head 1 - sector 2 |
| 2 | cylinder 1 - head 2 - sector 1 |
| 3 | cylinder 2 - head 1 - sector 2 |

As illustrated in Table 1, reserved blocks of the data storage medium 12 may be adjacent to each other or may be blocks between which some blocks are skipped. The skipped blocks may be bad blocks. The reserved blocks may thus be arranged in an order that allows access despite the presence of bad blocks or blocks being used to store other information.

Thus, when data is written based on the virtual address, the data can be written according to an order of the reserved blocks of the data storage medium 12 to correspond to the virtual addresses. Also, virtual addresses may be defined in such a manner that a number representing a reserved block may be allocated to the CHS according to a page stored in a table. Thus, the virtual address may be referred to as a virtual page number (VPN).

In order to access the data storage medium 12 according to the virtual addresses, the controller 110 may be divided into three layers as illustrated in FIG. 1 and thus may control the interface between the host (not illustrated) and the HDA 120 using at least one of the three layers.

That is, as illustrated in FIG. 1, the controller 110 may include a first layer 111, a second layer 112, and a third layer 113. When the data storage device 100 is the HDD, the first layer 111, the second layer 112, and the third layer 113 may be defined as HDD translation layers (HTL) since the controller 110 converts the LBAs included in the command of the host into the virtual addresses.

The first layer 111 may classify a command received from the host into a data command and a non-data command, and may be referred to as a HDD interface layer (HIL). The data command may include a read command and a write command. The non-data command may include a setting feature command to change a setting of the HDA 120, a standby command, a reset command, or the like.

The second layer 112 may convert an LBA, which is included in a data command received from the HDD interface layer 111, into a virtual address (VA), and may be referred to as a virtual mapping layer (VML). The virtual mapping layer 112 may be implemented to use three memory queues so as to convert the LBA into the VA. The three memory queues may work in conjunction with the memory 130 to manage address information of data to be written to and read from the at least one data storage mediums 12.

The third layer 113 may convert the VA transmitted from the second layer 112 into the CHS, and thus, access the data storage medium 12 of the HDA 120, and may be referred to as the access and operation layer. The access and operation layer 113 may also operate the HDA according to access of the at least one data storage medium 12 with respect to the CHS based on the VA and the non-data command.

Figure 3:
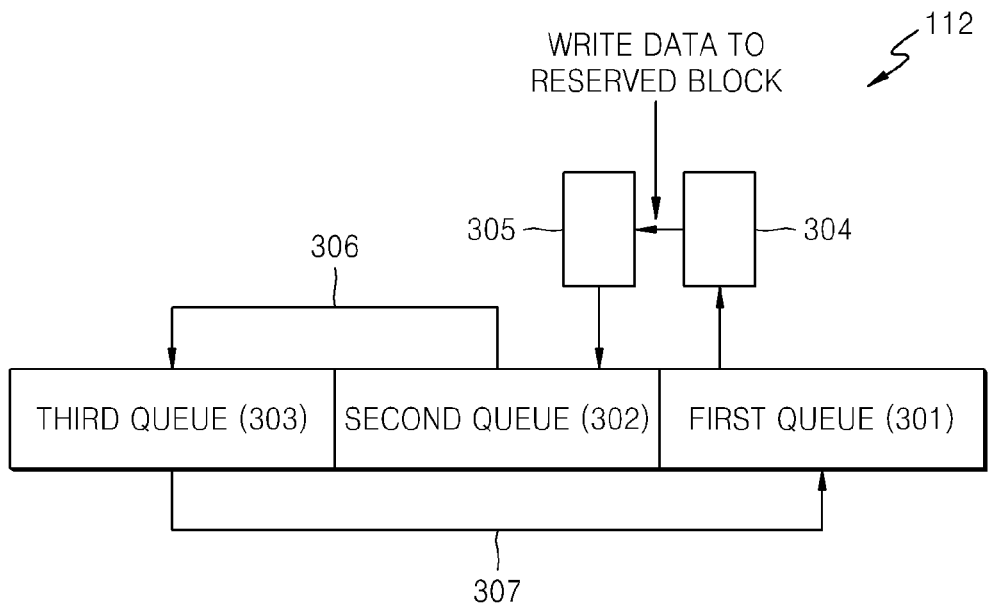
FIG. 3 is a diagram illustrating queues that may be included in a second layer of a controller of FIG. 1.

FIG. 3 is a diagram illustrating queues that may be included in the virtual mapping layer 112.

A first queue 301 manages and stores at least one reserved block information (RBI) having different priorities of the data storage medium 12 included in the HDA 120, and may be referred to as a free queue. Each RBI may correspond to a reserved block having a different CHS in the data storage medium 12 or plurality of mediums. A second memory queue 302 manages at least one piece of mapping information regarding mapping between the LBA and the VA, and may be referred to as an allocation or mapping queue. A third queue 303 manages one or more pieces of invalid block information of the data storage medium 12, and may be referred to as a garbage queue. The VAs, RBI, mapping information, and invalid block information may be stored in the memory 130 during the various stages of the write and read processes in the present general inventive concept.

An operation of the virtual mapping layer 112 using the first, second and third queues 301, 302 and 303 will now be described. When the data command that includes a LBA is received from the HDD interface layer 111 and the data command is a write command, reserved block information managed and stored by the free queue 301 is selected. In the case where a plurality of pieces of reserved block information exist in the free queue 301, reserved block information having a first priority from among the plurality of pieces of reserved block information is selected. A reference numeral 304 of FIG. 3 corresponds to the selected reserved block information.

At this time, the VML 112 of the controller 110 may call or signal the access and operation layer 113, and move the head 16 to a reserved block of the data storage medium 12, wherein the reserved block corresponds to the selected reserved block information 304. Accordingly, data may be directly written to the reserved block of the data storage medium 12 so that an access time of a data write operation may be reduced. The reserved block information stored in and selected from the free queue 301 may include a CHS, a VA corresponding to the CHS, and metadata, which exist with respect to corresponding reserved blocks. The metadata may include a write count, a read count, and a retry count which exist with respect to the corresponding reserved blocks.

As illustrated in FIG. 3, when data is written to the reserved block of the data storage medium 12 by the head 16 after the reserved block is selected, a VA corresponding to a CHS included in the selected reserved block information (SRBI) is allocated or mapped by the allocation queue 302 of the VML 112 to the LBA that is included in the received data command. The selected reserved block information that includes the VA of the reserved block is then set as active block information 305 and stored in the memory 130. The aforementioned process of selecting the reserved block information from the free queue 301 and setting the selected reserved block information as the active block information 305 is performed whenever a single or a plurality of write commands is received from the host.

When a number of reserved blocks of the data storage medium 12 have been set and stored as pieces of active block information 305 and the number of written to reserved blocks are made to be equal to or greater than a predetermined number N via the aforementioned write process, the controller 110 uses the VML 112 to check whether at least one piece of mapping information that already exists in the second allocation (mapping) queue 302 includes one or more VAs equal to the VAs included in the reserved block information that is set as the active block information 305. The at least one piece of mapping information pre-stored in the allocation queue 302 or in the memory 130 may include at least one LBA, a VA allocated to the LBA, a CHS corresponding to the VA, and meta information allocated to each block. The meta information may include meta information defined in the free queue 301. As a result of the check, if the same VA is not included in the at least one piece of mapping information already existing in the second allocation queue 302, the controller 110 inserts at least N pieces of active block information from the memory 130 that correspond to the written to reserved blocks of the data storage medium 12 into the allocation queue 302. As a result, the allocation queue 302 may include VAs corresponding to the CHSs of the written to reserved blocks.

However, as a result of the check, if it is determined that the at least one VA included in the reserved block information that is set as the active block information is the same VA that is included in the at least one piece of mapping information that already exists in the allocation queue 302, the controller 110 may set block information in which the VA included in the at least one piece of mapping information already existing in the allocation queue 302 to be allocated as invalid block information, and thus transmit the invalid block information to the garbage queue 303 (refer to a process 306 illustrated in FIG. 3). The controller 110 may then insert the active block information 305 stored in the memory 130 into the allocation queue 302. N is an integer that may be set based on a condition by which a certain amount of active block information may be inserted into the allocation queue 302 at one time.

When a status with respect to the one or more pieces of invalid block information of the garbage queue 303 indicates a full status, or when an operation status of the data storage device 100 is in an idle state or idle mode, the garbage queue 303 may sort the one or more pieces of invalid block information according to meta information about the one or more pieces of invalid block information, and transmit the sorted block information to the free queue 301 (refer to a process 307 illustrated in FIG. 3) in order to transfer the invalid block information into available reserved block information to be re-used in a write operation. The previous invalid block information may be re-used, for example, when a file is deleted and data may be re-written over the corresponding CHS location in the data storage medium 12. The one or more pieces of invalid block information may be sorted according to a write count, a read count, or a retry count, which are included in the meta information. Also, the garbage queue 303 may have applied thereto an algorithm based on a movement line of a head in such a manner that the one or more pieces of invalid block information may be sorted according to the movement line of the head obtained by considering a minimum movement of the head 16.

Also, when the data command received from the HDD interface layer 111 is the read command, the controller 110 using the virtual mapping layer 112 searches for a VA in the allocation queue 302 by using an LBA included in the read command. When the VA in the allocation queue 302 is searched for, the controller 110 using the virtual mapping layer 112 may call the third access and operation layer 113, move the head 16 to a CHS corresponding to the searched VA, and thus, can read data from the data storage medium 12.

As described above, the data storage device 100 according to the current embodiment may write data in an order of valid blocks by separately managing a reserved block and an active block by using the free queue 301 and the allocation queue 302, and thus, may reduce access latency. Also, the data storage device 100 may easily search for a VA stored in the allocation queue 302 during a data read operation. In addition, when the data storage device 100 accesses the data storage medium 12, the data storage device 100 performs wear leveling on a data area of the data storage medium 12 by using the write count information, the read count information, the bad block information, the retry information, or the moving line of a head obtained by considering the most minimum movement of the head 16. By doing so, the data storage device 100 may reduce occurrence of an adjust track write (ATW) or adjust track read (ATR) phenomenon.

The data storage device 100 may include not only the HDD using CHS but also all storage mediums that may have a specific address value at an area of the storage mediums. Accordingly, the VA may be applied to not only the HDD but also to other storage mediums.

As described above, since at least the data storage medium 12 is sequentially accessed according to a virtual page number (VPN) that is the VA that corresponds to reserved block information in the free queue 301 and selected therefrom, a seek operation and/or a head switching operation may be reduced or eliminated when data is written, and thus, an access time may be reduced.

Figure 4:
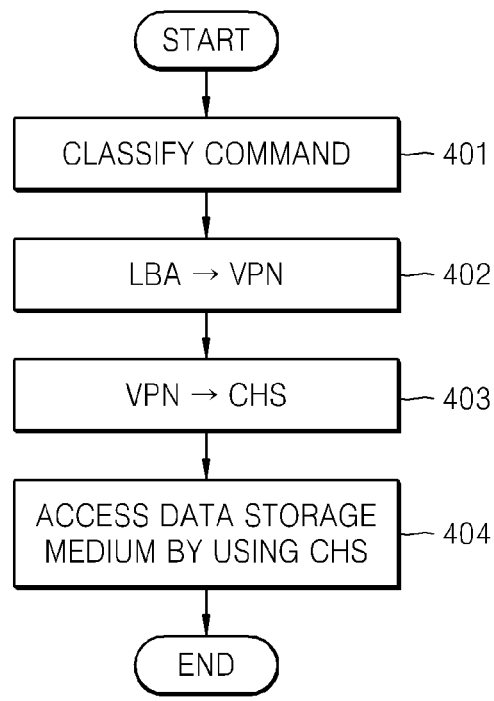
FIG. 4 is a flowchart illustrating a data storage medium accessing method, according to an embodiment of the present general inventive concept.

FIG. 4 is a flowchart illustrating a data storage medium accessing method, according to an embodiment of the present general inventive concept. The data storage medium accessing method of FIG. 4 may be performed in the controller 110 of FIG. 1.

Referring to FIG. 4, in operation 401, the HDD interface layer 111 classifies a command received from the host into a data command or a non-data command. In operation 402, an LBA included in the command from a host is converted into a VPN. The plurality of queues including the free queue 301, allocation queue 302 and garbage queue 303 of the virtual mapping layer 112 may be used in this address conversion in a similar manner to the use of the plurality of queues as described with reference to FIGS. 1 through 3. The VPN, as illustrated in operation 403, corresponds to a CHS of the data storage medium 112 and a reserve block selected from the free queue 301. In operation 404, the data storage medium 112 is accessed by using the CHS of the reserved block selected from the free queue 301.

FIG. 5 is a flowchart illustrating an example embodiment to convert the LBA of FIG. 4 into a VPN. The example of FIG. 5 may also be operated in the controller 110 of FIG. 1.

Referring to FIG. 5, in operation 501, when the controller 110 HDD interface layer 111, the controller 110 determines that a data command is received from a host, in operation 502, the controller 110 determines whether the data command is a read command. As a result of the determination, if the received data command is not a read command but is a write command, in operation 503, the controller 110 selects reserved block information from among one or more pieces of reserved block information stored in the first (or free) queue 301 of the virtual mapping layer 112. In operation 504, the controller 110 calls the access and operation layer 113 and moves the head 16 to a reserved block of the data storage medium 12, wherein the reserved block corresponds to the selected reserved block information.

In operation 505, the controller 110 uses the VML 112 to map a VPN included in the selected reserved block information to an LBA included in the received data command. Accordingly, the LBA included in the received data command is mapped with the VPN included in the selected reserved block information. In operation 506, the controller 110 calls the access and operation layer 113 and writes data to the reserved block of the data storage medium 12.

In operation 507, when the controller 110 determines that the data is written to the reserved block, in operation 508, the controller 110 sets the selected reserved block information as active block information, stores the active block information in memory 130, and determines whether a number of pieces of active block information is equal to or greater than a predetermined number N (operation 509). If the number of the active block information is not equal to or greater than N, the controller 110 returns to operation 501 and then re-performs the aforementioned operations 501 through 509 to accumulate additional active block information.

If the number of the active block information is equal to or greater than N, the controller 110 inserts mapping information about mapping between the LBA and the VPN into the second (or allocation) queue 302 (operation 510).

In operation 511, if the received data command is the read command, the controller 110 searches for a VPN in the mapping information of the second queue 302, wherein the VPN corresponds to an LBA included in the read command, and calls the access and operation layer 113, thereby accessing the data storage medium 12 so as to perform a data read operation according to the searched VPN.

In operation 501, if another command other than the data command is received, the other command may be a non-data command, and thus, the controller 110 calls the access and operation layer 113 directly from the HDD interface layer 111, and controls operations of the HDA 120 according to the non-data command.

Figure 6A:
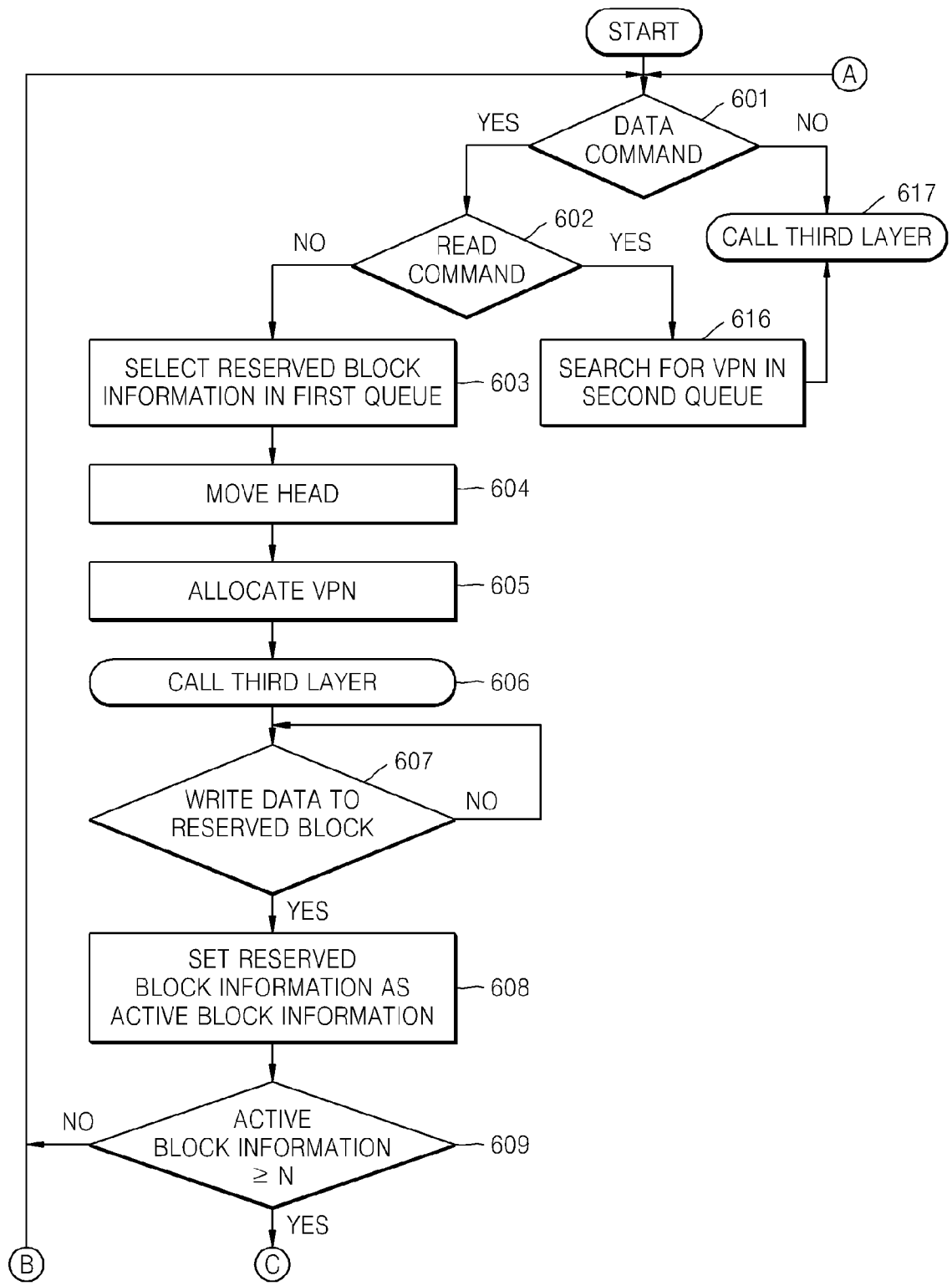
FIGS. 6A and 6B are flowcharts illustrating another example to convert the LBA of FIG. 4 into a VPN according to an embodiment of the present general inventive concept.
Figure 6B:
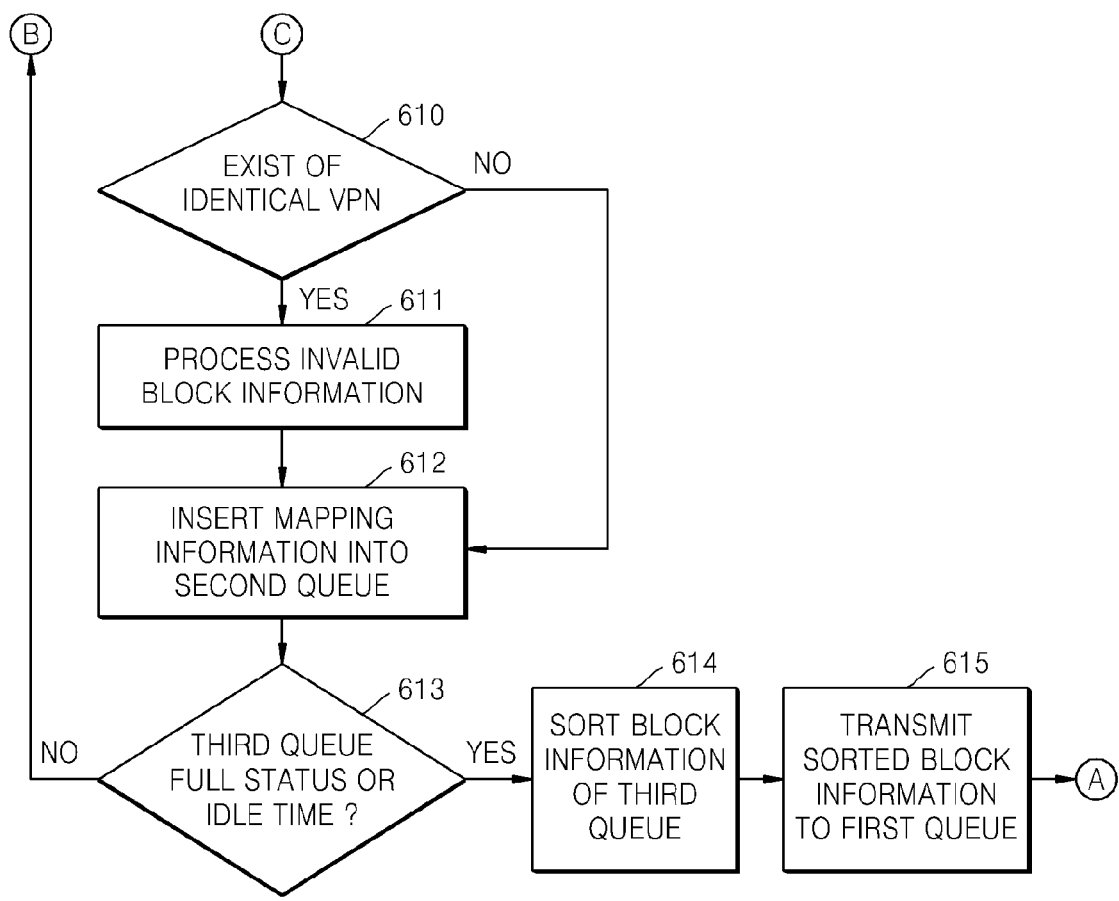

FIGS. 6A and 6B are flowcharts illustrating another example to convert the LBA of FIG. 4 into a VPN. The example of FIGS. 6A and 6B is the same as the example of FIG. 5, except that an operation of the third (or garbage) queue 303 of FIG. 3 is added to the example of FIGS. 6A and 6B. Thus, since operations 601 through 609, and operations 616 and 617 correspond to those of the example of FIG. 5, descriptions thereof will not be repeated here.

Before inserting the active block information into the allocation queue 302, the controller 110 determines whether a pre-stored VPN, which could be identical to a VPN included in the active block information to be inserted, is in the mapping information that already exists in the second queue 302 (operation 610).

If the identical VPN exists, the controller 110 may set block information corresponding to the identical VPN existing in the second queue 302 as invalid block information, and then transmits the invalid block information to the third queue 303 (operation 611). After that, the controller 110 inserts the active block information into the second queue 302 (operation 612). If the identical VPN does not exist, the controller bypasses operation 611 and inserts the active block information into the second queue 302 at 612, similar to operation 510 described above.

If the third queue 303 is in a full status, or an operation of the data storage device 100 is in an idle mode, the controller 110 may sort the invalid block information of the third queue 303 (operation 614). The sorting operation is performed in a similar manner with that described in relation to FIG. 3. Next, the controller 110 transmits the sorted block information to the first queue 301.

Meanwhile, in operation 613, if the status of the third queue 303 is not the full status, or if the data storage device 100 is not in the idle time, the controller 110 returns to operation 601 and re-performs the aforementioned operations.

The present general inventive concept can be implemented as a method, an apparatus, or a system. The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly illustrated and described with reference to exemplary embodiments thereof, it will be understood that various changes in form and details may be made therein without departing from the spirit and scope of the following claims.

What is claimed is:

1. A method comprising:
   converting a logical block address (LBA) from a host command into a virtual address (VA) of a selected reserved block from a plurality of reserved blocks of a data storage medium available to store data, the plurality of reserved blocks indexed in a first queue; and
   accessing the data storage medium using the VA to store data in the selected reserved block;
   identifying the selected reserved block as an active block in the first queue; and
   inserting mapping information about mapping between the LBA and the VA into a second queue responsive to a total number of active blocks identified by the first queue equaling or exceeding a predetermined number.

2. The method of claim 1, in which the plurality of reserved blocks available to store data and indexed in the first queue are non-adjacent one another on the data storage medium.

3. The method of claim 1, wherein the inserting of the mapping information comprises:
   checking whether a VA indexed in the second queue is identical to the VA comprised in the mapping information before inserting the mapping information; and
   if the identical VA exists in the second queue, setting block information to which the identical VA is allocated as invalid block information, and transmitting the invalid block information to a third queue.

4. The method of claim 3, in which the converting of the LBA further comprises sorting the one or more pieces of invalid block information in the third queue, and transmitting sorted block information to the first queue.

5. An apparatus comprising:
   a data storage medium; and
   a controller adapted to convert a logical block address (LBA) in a command received from a host into a virtual address (VA) based on a reserved block of the data storage medium and to access the data storage medium using the VA, wherein the reserved block is a valid block that is ready to have data written thereto; and
   a memory which stores a first queue to manage one or more pieces of reserved block information of the data storage medium, a second queue to manage at least one piece of mapping information about mapping between the LBA and the VA, and a third queue to manage one or more pieces of invalid block information of the data storage medium, wherein the controller is further adapted to sort the one or more pieces of invalid block information and transmit the sorted block information to the first queue.

6. The apparatus of claim 5, wherein the controller controls an interface between the host and the data storage medium via three layers comprising a first layer to classify each command received from the host into a data command or a non-data command, a second layer to convert an LBA in a data command received from the first layer into a VA, and a third layer to access the data storage medium based on the VA, wherein the first, second and third queues are disposed in the second layer.

7. The apparatus of claim 5, wherein responsive to the command comprising a write command and reserved block information is selected from among the one or more pieces of reserved block information of the first queue, the controller directs writing of data to the associated reserved block corresponding to the VA, and responsive to the command comprising a read command, the controller searches for a VA to correspond to an LBA in the read command using the mapping information in the second queue.

8. A method, comprising:
   receiving a host command from a host that includes a data write command;
   converting a logical block address (LBA) included in the host command into a virtual address (VA) to correspond to reserved block information of the data storage medium;
   selecting reserved block information among a plurality of pieces of reserved block information managed by a first queue of a controller;
   selecting a reserved block including a VA in which to write a data instruction of the write command, wherein the VA corresponds to a cylinder head sector (CHS) of the reserved block of the data storage medium; and
   moving a head of a head disk assembly to the reserved block to correspond to the selected reserved block information to write data to the reserved block, wherein the reserved block information in the first queue includes a CHS and VA of the reserved block.

9. The method of claim 8, further comprising mapping a VA included in the reserved block to the LBA included in the data write command, setting the selected reserved block information as active block information when data is written to the reserved block of the data storage medium and allocating the mapping information into a second queue of the controller.

10. The method of claim 9, further comprising checking whether a plurality of selected reserved block information of the data storage medium has been written to a predetermined number of active block information and checking whether at least one piece of mapping information in the second queue includes a VA that is the same as a VA included in the reserved block information that is set as the active block information.

11. The method of claim 10, responsive to the VA in the second queue not corresponding to the VA included in the active block information, inserting the predetermined number pieces of active block information into the second queue.

12. The method of claim 10, responsive to the VA in the second queue corresponding to the VA included in the active block information, setting a block information status of a VA pre-existing in the second queue to be invalid block information and transmitting the invalid block information to a third queue of the controller.

13. An apparatus comprising:
   a data storage medium;
   a controller adapted to receive host commands including logical block addresses (LBAs) from a host and to control an interface between the host and the medium based on the host commands, the controller comprising a first queue to select a plurality of reserved blocks in the data storage medium that include reserved block information including virtual addresses (VAs) corresponding to cylinder head sectors (CHSs) of the reserved blocks, a memory to store active block information to correspond to reserved block information of the reserved blocks, a second queue to store mapping information of the VAs that correspond to the LBAs of the host commands, and a third queue to recycle invalid reserved block information to the first queue; and a head unit to be moved by the controller to a location of the selected reserved blocks selected from the first queue and to write data from the host command into the reserved blocks.

14. The apparatus of claim 13, wherein the controller forms active block information from the selected reserved block information that includes the VAs of the reserved blocks and stores the active block information in the memory.

15. An apparatus comprising a controller adapted to receive host commands comprising logical block addresses (LBAs) and to control an interface between the host and a data storage medium based on the host commands, the controller comprising a first queue to select a plurality of reserved blocks in the data storage medium that include reserved block information including virtual addresses (VAs) corresponding to physical addresses of the reserved blocks, a memory to store active block information to correspond to reserved block information of the reserved blocks, a second queue to store mapping information of the VAs that correspond to the LBAs of the host commands, and a third queue to recycle invalid reserved block information to the first queue.

16. The apparatus of claim 15, in which the controller is further adapted to direct writing of data from the host command to the reserved blocks selected from the first queue.

17. The apparatus of claim 15, in which the controller is further adapted to identify selected reserved blocks from the first queue as active blocks responsive to data write operations to the physical addresses associated with the selected reserved blocks, and to insert mapping information into the second queue responsive to a total number of the active blocks equaling or exceeding a predetermined number.

18. The apparatus of claim 15, in which the data storage medium comprises a rotatable disc, and the apparatus further comprises a data transducing head moved by the controller to a position adjacent a selected reserved block from the first queue to write data to the selected reserved block during servicing of the host command.

19. The apparatus of claim 15, in which, responsive to a host write command, the controller directs writing of data to the associated reserved block corresponding to the VA.

20. The apparatus of claim 15, in which, responsive to a host read command, the controller searches for a VA to correspond to an LBA in the read command using the mapping information in the second queue.

21. An apparatus comprising a controller adapted to convert a logical block address (LBA) from a host write command into a virtual address (VA) to correspond to reserved block information of a data storage medium, to select reserved block information among a plurality of pieces of reserved block information in a first queue, to select a reserved block including a VA in which to write a data instruction of the write command where the VA corresponds to a physical address of the data storage medium, and to direct a data write operation to the physical address, the reserved block information in the first queue listing the physical address and the VA of the reserved block.

22. The apparatus of claim 21, in which the controller is further adapted to map a VA included in the reserved block to the LBA included in the data write command, to set the selected reserved block information as active block information when data is written to the reserved block of the data storage medium, and to allocate the mapping information into a second queue.

23. The apparatus of claim 21, in which the controller is further adapted to determine whether a plurality of selected reserved block information of the data storage medium has been written to a predetermined number of active block information and to determine whether at least one piece of mapping information in the second queue includes a VA that is the same as a VA included in the reserved block information that is set as the active block information.

24. The apparatus of claim 23, in which the controller is further adapted to insert the predetermined number pieces of active block information into the second queue responsive to the VA in the second queue not corresponding to the VA included in the active block information.

25. The apparatus of claim 23, in which the controller is further adapted to set a block information status of a VA pre-existing in the second queue to be invalid block information and transmitting the invalid block information to a third queue responsive to the VA in the second queue corresponding to the VA included in the active block information.

* * * * *